A. F. COPERSITO.
VISUAL SIGNAL DEVICE FOR VEHICLES.
APPLICATION FILED OCT. 15, 1912.

1,111,738. Patented Sept. 29, 1914.

WITNESSES

INVENTOR
Anthony F. Copersito,
his Attorney

UNITED STATES PATENT OFFICE.

ANTHONY F. COPERSITO, OF BROOKLYN, NEW YORK, ASSIGNOR OF ONE-HALF TO JOHN McMAHON, OF NEW YORK, N. Y.

VISUAL-SIGNAL DEVICE FOR VEHICLES.

1,111,738.   Specification of Letters Patent.   Patented Sept. 29, 1914.

Application filed October 15, 1912. Serial No. 725,909.

*To all whom it may concern:*

Be it known that I, ANTHONY F. COPERSITO, a citizen of the United States, residing at Brooklyn, in the county of Kings and State of New York, have invented new and useful Improvements in Visual-Signal Devices for Vehicles, of which the following is a specification.

My present invention relates to visual signal devices more particularly adapted for use on vehicles such as automobiles, to be disposed at the rear end thereof, and whereby reduction of speed or stalling of the vehicle may be visually noted from the device.

A device constructed according to my invention is particularly desirable for use in connection with vehicles on crowded highways, where a succession of vehicles are traveling, since it provides a means whereby accidents, such as rear end collisions, may be avoided.

The principal objects of my invention are to provide a signal device of the character described which is simple in construction, and hence, inexpensive to manufacture; one which will work automatically according to whether the vehicle moves or not; and, to render the device susceptible of use at night-time, when it is most desirable to indicate by lights, whether the vehicle is moving or stalled.

Figure 1:
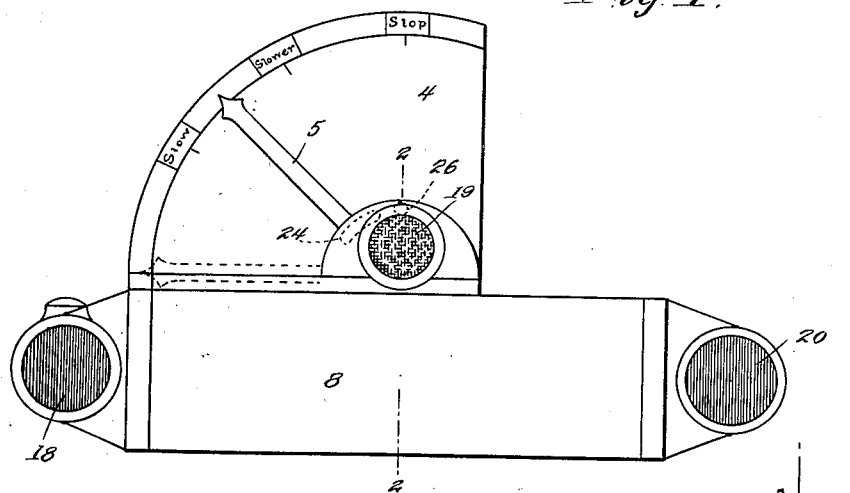
Figure 3:
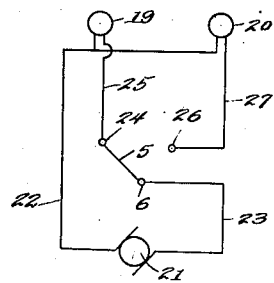
Figure 4:
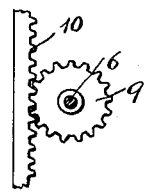
Figure 2:
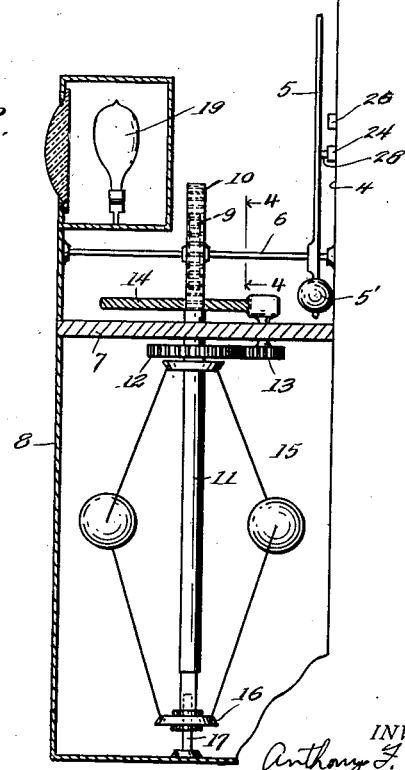

Other objects of my invention will appear in the following detailed description, taken in connection with the accompanying drawing, forming a part of this specification, and in which drawing:

Figure 1 is a front elevation of the device embodying my invention. Fig. 2 is an enlarged sectional view on the line 2—2 of Fig. 1. Fig. 3 is a diagrammatic view of electrical connections. Fig. 4 is a fragmentary detail view on the line 4—4 of Fig. 2.

In the drawings, where similar characters refer to similar parts, 4 designates a dial having markings thereon to indicate the low speed of the moving vehicles, as by the words "Slow" and "Slower," and stalling by the word "Stop." An indicator 5 is provided to move over the face of dial 4, and is mounted upon a spindle 6 journaled in suitable frame-work 7. A counter weight 5' may be provided in connection with indicator 5 so that said indicator may be swung freely about its axis.

The frame-work 7 may be so constructed that one face 8 thereof may serve for the reception of an automobile license tag, not shown in the drawing.

Rigid with spindle 6 I provide a toothed wheel 9, with which co-meshes a reciprocable rack 10. As means for imparting movement to rack 10, I provide a tubular standard 11 revolubly carried by frame-work 7, and through which standard said rack projects. The standard 11 has secured thereto a gear 12 with which co-meshes a second gear 13 adapted to be actuated by flexible transmission 14, adapted to be operatively connected with transmission of the vehicle moving at a positive velocity ratio with the tread of the wheels thereof. Revoluble with standard 11 is a governer 15, preferably of the weighted pendulum type, and having an actuating annulus 16, movable by the centrifugal action upon the weights of the governor. The lower end of the governor is stabilized by means of a pin extending through said annulus and into the one end of rack 10, opposite from the teeth thereof. The annulus 16 is operatively connected with rack 10 so that reciprocation of said annulus will be transmitted to the rack.

Laterally of the license tag space, I have disposed the usual tail lamp 18, and to be disposed in proximity to the tag and relative to the markings "Slower" and "Stop" I provide a lamp 19, preferably yellow in color, to indicate low speed of the vehicle, and a second signal lamp 20, preferably red in color, for indicating the stalling of the vehicle, or as a danger signal.

Referring now more particularly to Fig. 3 of the drawing, 21 designates an electric generator, of any suitable type, from which a conductor 22 leads to one of the poles of each of lamps 19 and 20, the other conductor of said generator leading to spindle 6. The indicator 5 carries on its face adjacent the dial 4, a contact 28 adapted to coöperate with either of two contacts 24 or 26, disposed equidistant from the axis of spindle 6. The contact 24, through conductor 25 is operatively connected with the other pole of lamp 19, while contact 26, through conductor 27 is operatively connected with the other pole of lamp 20. The contacts 24 and 26 are disposed relative to the markings on dial 4, so that when the indicator 5 points to the marking "Slower" the circuit may be completed through contacts 24 and 28, and, as the indicator is moved to point to marking "Stop" the circuit may be completed through contacts 26 and 28.

The operation of the device is as follows: Assuming that the device is so constructed as to operate as a visual signal device, only when the speed of the vehicle is less than five miles per hour, the indicator is positioned, as indicated in dotted lines of Fig. 1, when the speed of the vehicle is over five miles per hour. As the speed decreases, the governor 15 is very sensitive, and at once actuates the rack 10 so that the indicator 5 moves over the dial face. When movement of the vehicle is retarded so as to travel at very slow speed, the indicator will point to the markings "Slower," and if the circuit forming by conductors 22 and 23 is otherwise complete, the lamp 19 will be switched on through contacts 24 and 28. Should the vehicle become stalled, the indicator 5 will immediately point to the marking "Stop" and light 20 will be switched on through contacts 26 and 28.

Changes may be made in detail without departing from the spirit or scope of my invention; but,

I claim:—

1. In visual signal devices for vehicles, the combination of a dial adapted to be disposed at the rear end of a vehicle and having markings to indicate low speed and stalling of the vehicle, an indicator for said dial, a plurality of electric lights in close proximity to said dial and disposed relative to the markings thereon to indicate low speed and stalling of the vehicle, a contact for each of said lights, a contact carried by said indicator for co-action with said first mentioned contacts, and means adapted for operation by transmission of the vehicle moving at a positive velocity ratio with respect to the tread of the wheels thereof to actuate said indicator, substantially as and for the purpose set forth.

2. In a visual signal device for vehicles, the combination of a dial adapted to be disposed at the rear end of the vehicle and having markings to indicate low speed and stalling of the vehicle, an indicator yieldably held by gravity pointing at the marking of said dial indicating stalled, mechanism adapted for connection with transmission of the vehicle, moving at a positive velocity ratio with the tread of a wheel thereof, for moving said indicator from a normal position, two electric lights, one to indicate low speed and the other stalling of the vehicle, a contact for the light indicating stalling disposed in conducting relation to said indicator when the latter is in a normal position, and a contact for the other of said lights disposed to be in conducting relation to said indicator when the latter moves to indicate low speed, substantially as and for the purpose set forth.

3. In a visual signal device for vehicles, the combination of a dial adapted to be disposed at the rear end of a vehicle and having markings to indicate low speed and stalling of the vehicle, an indicator weighted to normally point at the markings of the said dial indicating stalling, mechanism adapted for connection with transmission of the vehicle moving at a positive velocity ratio with the tread of the wheel thereof, for moving said indicator from a normal position, two electric lights, one to indicate low speed and the other stalling, said means being disposed in close proximity to said dial and relative to the markings thereof, a contact for the light indicating stalling disposed in conducting relation to said indicator when the latter is in a normal position, and the contact for the other of said lights disposed to be in conducting relation to said indicator when the latter moves to indicate low speed, substantially as and for the purpose set forth.

ANTHONY F. COPERSITO.

Witnesses:
MICHAEL COLASO,
JOHN MCMAHON.